US007955176B2

(12) United States Patent
Tastad et al.

(10) Patent No.: US 7,955,176 B2
(45) Date of Patent: Jun. 7, 2011

(54) BUTTON PANEL ASSEMBLY FOR A GAMING MACHINE

(75) Inventors: Gregory J. Tastad, Kenosha, WI (US); Norman R. Wurz, Des Plaines, IL (US)

(73) Assignee: WMS Gaming Inc., Waukegan, IL (US)

( * ) Notice: Subject to any disclaimer, the term of this patent is extended or adjusted under 35 U.S.C. 154(b) by 829 days.

(21) Appl. No.: 10/201,833

(22) Filed: Jul. 24, 2002

(65) Prior Publication Data

US 2004/0018877 A1 Jan. 29, 2004

(51) Int. Cl.
*A63F 13/00* (2006.01)

(52) U.S. Cl. ........................ 463/46; 463/36; 312/334.44

(58) Field of Classification Search ................ 463/1–69; 273/138.1, 148 B, 148 R, 317–361; 174/52.1; 160/1–405; D13/100–199; 445/1–73; 439/1–957; 700/83–85; 312/8.5, 9.3, 9.14, 9.34, 9.47, 312/119, 122, 260, 261, 249.4, 334.44, 334.47
See application file for complete search history.

(56) References Cited

U.S. PATENT DOCUMENTS 3,961,435 A * 6/1976 Keckler .......................... 40/569
4,440,457 A * 4/1984 Fogelman et al. .............. 463/46
6,102,394 A 8/2000 Wurz et al. ................. 273/138.2
6,117,010 A 9/2000 Canterbury et al. ............ 463/20

FOREIGN PATENT DOCUMENTS

GB 2251329 A * 7/1992
GB 2265745 A * 10/1993
KR 10-1998-0009801 * 11/2003

* cited by examiner

*Primary Examiner* — James S McClellan
(74) *Attorney, Agent, or Firm* — Nixon Peabody LLP

(57) ABSTRACT

A gaming machine comprises a display, a cabinet, a front door, and a slide-in button panel. The display depicts a randomly selected game outcome. The cabinet houses the display. The front door is hinged to the cabinet and includes a frame. The slide-in button panel is mounted by sliding it into the frame and supports a plurality of physical buttons for operating the gaming machine. The button panel is easily removed from the frame for maintenance or replacement purposes.

12 Claims, 4 Drawing Sheets

BUTTON PANEL ASSEMBLY FOR A GAMING MACHINE

FIELD OF THE INVENTION

The present invention relates generally to button panels on gaming machines and, more particularly, to a button panel assembly for a gaming machine that facilitates manufacture, maintenance, and replacement of the button panel portion of the assembly.

BACKGROUND OF THE INVENTION

Gaming machines typically include a button panel supporting a plurality of physical buttons. In a multi-line video slot machine, for example, the plurality of buttons may include such buttons as pay line selection buttons (e.g., 1 Line, 3 Lines, 5 Lines, 7 Lines, 9 Lines), bet per line buttons (e.g., 1, 2, 3, 4, 5), "cash out" (or "collect"), "call attendant" (or "change"), etc. The buttons are employed by a player to operate the gaming machine. Heretofore, the button panel has been integrated with other machine components, such as a front door. The front door is hinged to the machine cabinet. The button panel may, for example, be integrally formed with a frame of the front door.

This arrangement suffers from several drawbacks. On the one band, if the button panel is not removed, the button panel can be difficult to access for such maintenance tasks as replacing burned out lamps or defective switches. On the other hand, if the button panel is removed for such purposes as maintenance or replacement, both the button panel and any integral machine components must be removed together even if such machine components do not themselves require maintenance or replacement. The removal of the integral machine components along with the button panel can be burdensome, especially if the machine components are somewhat large and unwieldy. Furthermore, if the button panel must be replaced, the integral machine components must also be replaced, thereby adding to the cost of the replacement kit.

Accordingly, a need exists for a button panel assembly that facilitates manufacture, maintenance, and replacement of the button panel portion of the assembly.

SUMMARY OF THE INVENTION

In accordance with the present invention, a gaming machine comprises a display, a cabinet, a front door, and a slide-in button panel. The display depicts a randomly selected game outcome. The cabinet houses the display. The front door is hinged to the cabinet and includes a frame. The slide-in button panel is mounted by sliding it into the frame and supports a plurality of physical buttons for operating the gaming machine.

The removable, slide-in button panel provides several advantages. First, if an operator wishes to replace the game executed on the gaming machine with a new game requiring a different configuration and/or number of buttons, the button panel may easily be replaced with another button panel suitable for the new game. Second, when the button panel is removed from the frame, the buttons can easily be accessed to replace burned out lamps and defective switches. Further, when the button panel is removed from the frame, access to other components (e.g., backlight lamps) on the gaming machine in that area may be improved.

BRIEF DESCRIPTION OF THE DRAWINGS

The foregoing and other advantages of the invention will become apparent upon reading the following detailed description and upon reference to the drawings.

Figure 1:
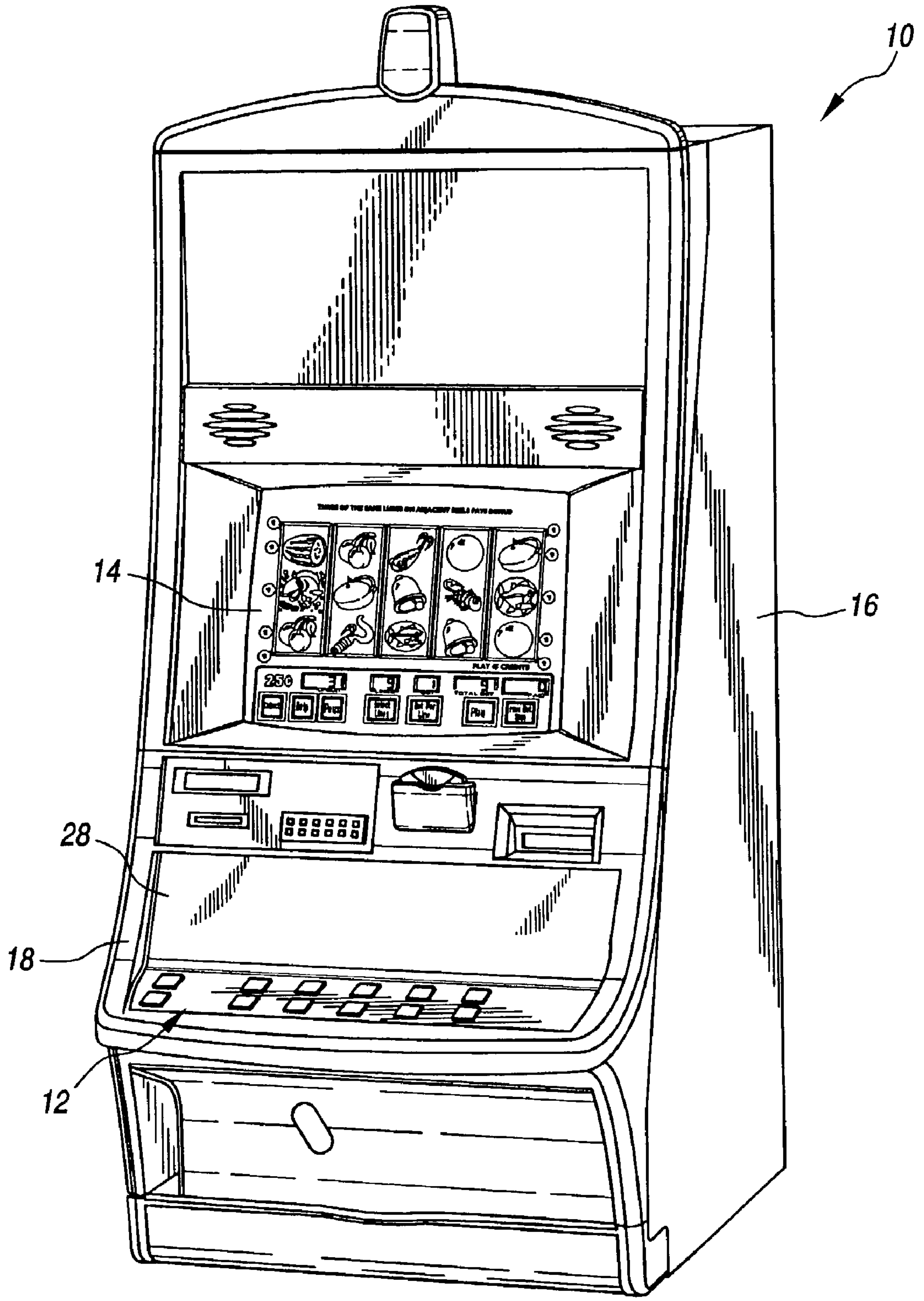
FIG. 1 is an isometric view of a gaming machine containing a button panel assembly embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENT

Referring now to the drawings, FIG. 1 depicts a gaming machine 10 containing a button panel assembly 12 embodying the present invention. The gaming machine 10 includes a display 14 for displaying a randomly selected game outcome, a cabinet 16 for housing the display 14, and a front door 18 hinged to the cabinet. The hinged front door 18 may be unlocked with a suitable key and opened by service personnel. The cabinet 16 also contains a central processing unit (CPU) for randomly selecting the game outcome. A glass frame assembly 28 assists in retaining the button panel assembly 12 in the assembled condition shown in FIG. 1.

Figure 2:
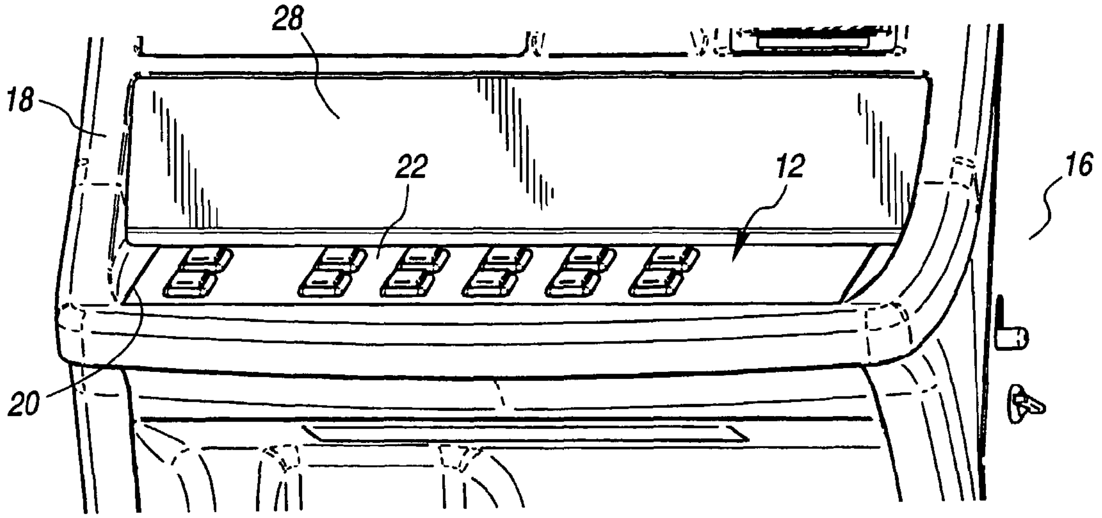
FIG. 2 is an enlarged isometric view of a portion of the gaming machine containing the button panel assembly, prior to removal of a button panel from a frame.
Figure 3:
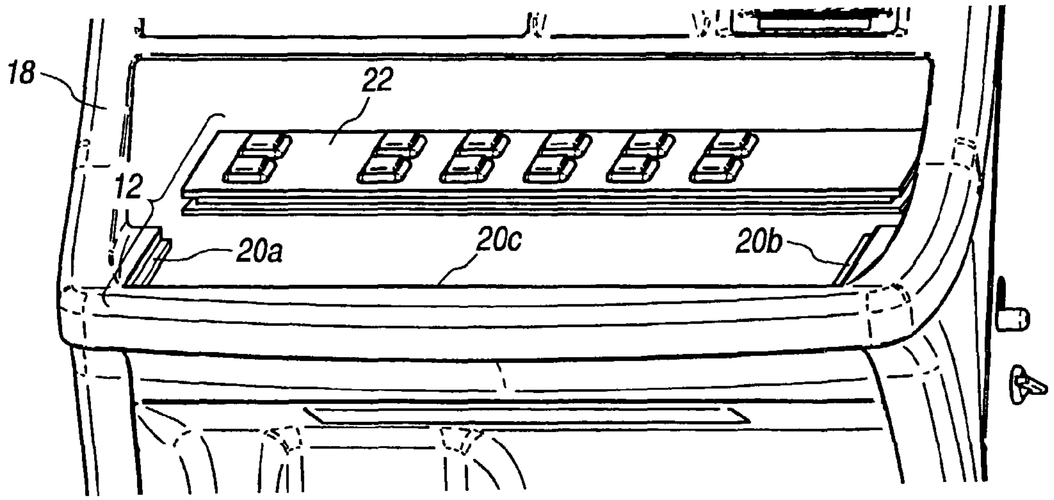
FIG. 3 is an enlarged isometric view of the portion of the gaming machine containing the button panel assembly, following removal of the button panel from the frame.

Referring to FIGS. 2 and 3, the button panel assembly 12 includes a frame 20 and a button panel 22 that slides into the frame 20. The button panel 22 supports a plurality of physical buttons for operating the gaming machine 10. FIG. 2 shows the button panel 22 prior to its removal from the frame 20. The glass frame assembly 28 assists in retaining the button panel 22 in the frame 20. FIG. 3 shows the button panel 22 following its removal from the frame 20. The glass frame assembly 28 must be disconnected and removed from the door 18 prior to removing the button panel 22 from the frame 20. The frame 20 includes first and second opposing sides 20*a* and 20*b* and a third side 20*c* extending between the first and second sides 20*a* and 20*b*. The frame 20 defines an open side opposite to the third side 20*c* and receives the button panel 22 via this open side.

Figure 4:
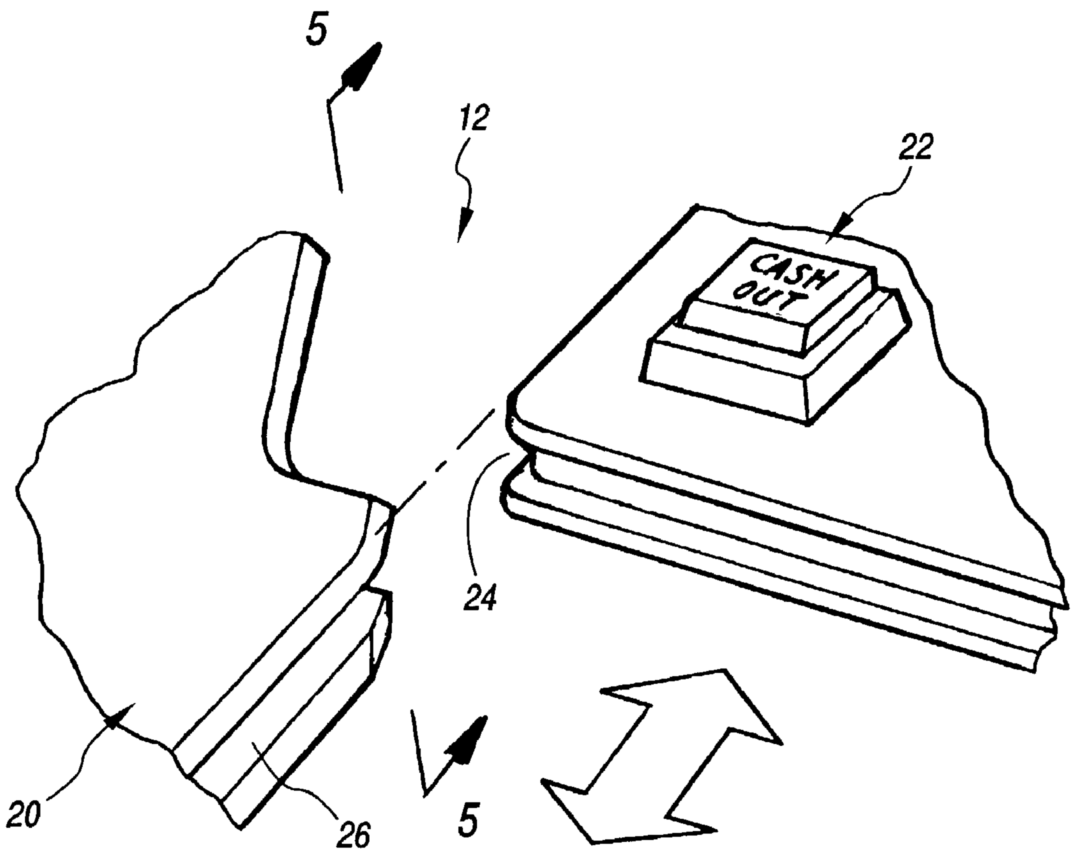
FIG. 4 is an enlarged isometric view showing the button panel removed from the frame.
Figure 5:
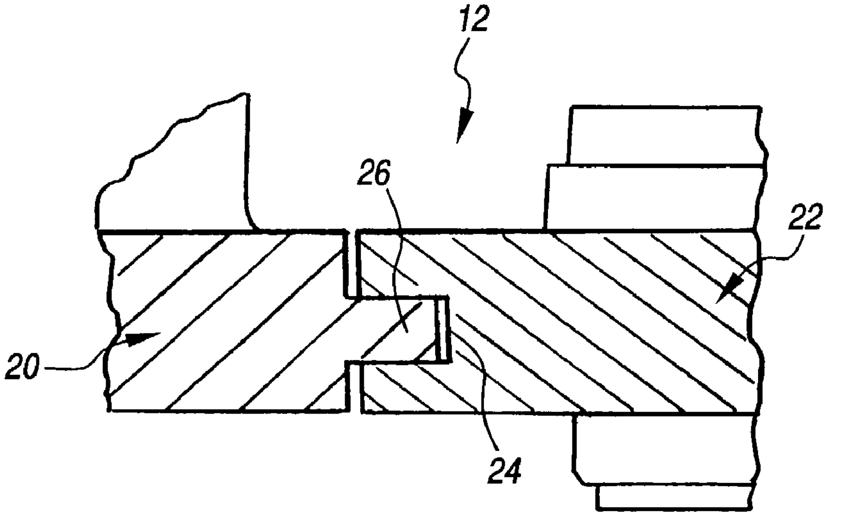
FIG. 5 is a cross-section taken generally along line 5-5 in FIG. 4.

FIGS. 4 and 5 shown the button panel assembly 12 in greater detail. To allow the button panel 22 to slide into the frame 20, a periphery of the button panel 22 forms a track or channel 24 and an interior of the frame 20 forms a protruding member 26. As shown in FIG. 5, the channel 24 receives the protruding member 26 therein to mount the button panel 22 to the frame 20. In an alternative embodiment, the button panel 22 forms the protruding member 26 while the frame 20 forms the channel 24.

Figure 6A:
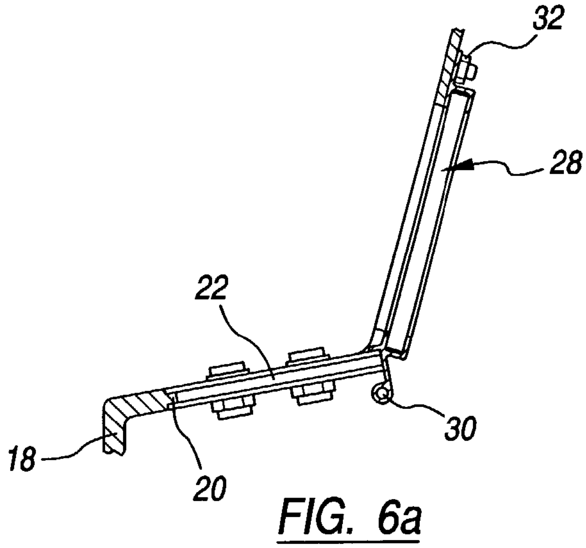
FIGS. 6*a*, 6*b*, and 6*c* are cross-sections showing a process for removing the button panel from the frame.
Figure 6B:
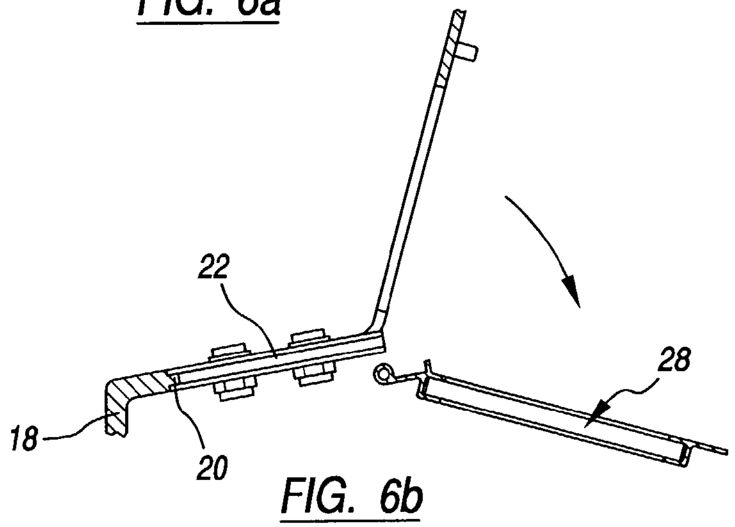
Figure 6C:
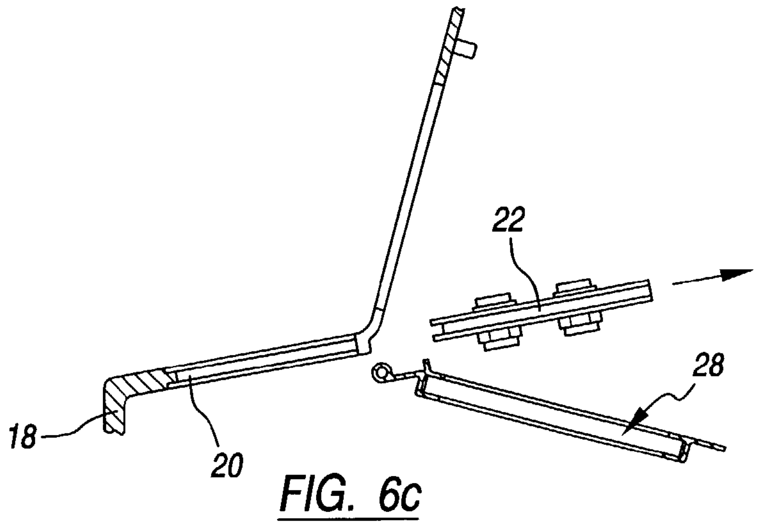

FIGS. 6*a*, 6*b*, and 6*c* depict the process for removing the button panel 22 from the frame 20. This process may, for example, be implemented by a service person wishing to service the button panel assembly 12. FIG. 6*a* shows the button panel 22 prior to its removal from the frame 20. The glass frame assembly 28 includes a shaped edge 30 to assist in retaining the button panel 22 in the frame 20. The shaped edge 30 abuts a rear side of the button panel 22. The glass frame assembly 28 is mounted to the door 18 by a fastener 32 such as a screw, bolt, rivet, or the like. Referring to FIG. 6*b*, to remove the button panel 22 from the frame 20 a service person first unlocks and opens the front door 18, removes the fastener 32, and then removes the glass frame assembly 28 from the door 18. Referring to FIG. 6*c*, the service person then dismounts the button panel 22 from the frame 20 by sliding the channel 24 (see FIGS. 4 and 5) away from the protruding member 26 (see FIGS. 4 and 5) until the protruding member 26 is no longer in the channel 24.

After removing the button panel 22 from the frame 20, the service person may perform any necessary service tasks on the button panel 22, such as replacing any burned out lamps or defective switches or replacing the button panel 22 itself with another button panel of the same size but having a different configuration and/or number of buttons. The replacement button panel may be more suitable for a new game to be loaded onto the gaming machine. After completing any service tasks, the service person re-assembles the button panel assembly by sliding the button panel 22 (or replacement button panel) into the frame 20, installing the glass frame assembly 28 on the front door 18, securing the glass frame assembly 28 to the door 18 with the fastener 32, and finally closing and locking the front door 18.

While the present invention has been described with reference to one or more particular embodiments, those skilled in the art will recognize that many changes may be made thereto without departing from the spirit and scope of the present invention. For example, a service person may elect to remove the button panel 22 from the frame 20 when servicing other components (e.g., backlight lamps) in that area because removal of the button panel 22 may improve access to such other components. Furthermore, the button panel assembly may include a single point electrical connection for connecting any electrical components on the button panel 22 to the main CPU. This electrical connection may, for example, be established by a single connector on the button panel 22 (or an underlying printed circuit board) which engages a mating connector at the end of a loose cable. Alternatively, the mating connector may be mounted to the frame 20. Each of these embodiments and obvious variations thereof is contemplated as falling within the spirit and scope of the claimed invention, which is set forth in the following claims.

What is claimed is:

1. An assembly for a wagering game machine, comprising:

a frame located on a front door of a cabinet, the door being movable between an open position and a closed position;

a button panel mounted to the frame by sliding the button panel along the frame, the button panel supporting a plurality of physical buttons for operating the wagering game machine; and a removable retention member to assist in retaining the button panel in the frame, the retention member having a secure position and an unsecure position, the retention member abutting a side of the button panel in the secure position to keep the button panel flush against the frame and retaining the button panel in the frame when the door is in the open position;

wherein the frame includes first and second opposing sides for slidably supporting and maintaining constant direct contact with the button panel and a third side extending between the first and second sides, the frame defining an open side opposite to the third side for receiving and removing the button panel via the open side, the retention member being disposed along the open side of the frame and holding the button panel in the frame when the retention member is in the secure position and the front door of the cabinet is in the open position, and allowing the button panel to be removed from the frame via the open side only when the front door of the cabinet is in the open position and only after the retention member has been moved from the secure position to the unsecure position.

2. The assembly of claim 1, wherein the front door is hinged to the cabinet, the frame being formed by the front door.

3. The assembly of claim 1, wherein one of a periphery of the button panel and an interior of the frame forms a channel and the other of the periphery of the button panel and the interior of the frame forms a protruding member, the channel receiving the protruding member therein to mount the button panel to the frame.

4. The assembly of claim 3, wherein the button panel forms the channel and the frame forms the protruding member.

5. A method of assembling a button panel assembly for a gaming machine, the method comprising:

providing a frame located on a front door of a cabinet, the door being movable between an open position and a closed position;

mounting a button panel to the frame by sliding the button panel into the frame via an open side thereof and along the frame, the button panel being removable towards the interior of the cabinet from the frame via the open side thereof and supporting a plurality of physical buttons for operating the gaming machine; and installing a removable retention member in the open side to assist in retaining the button panel in the frame when mounted to the frame, wherein the retention member, when installed, abuts a side of the button panel to keep the button panel flush against the frame and retains the button panel in the frame when the door is in the open position.

6. The method of claim 5, wherein the front door is hinged to the cabinet, the frame being formed by the front door.

7. The method of claim 5, wherein the step of mounting a button panel to the frame includes sliding the button panel into the frame.

8. The method of claim 5, wherein one of a periphery of the button panel and an interior of the frame forms a channel and the other of the periphery of the button panel and the interior of the frame forms a protruding member, and wherein the step of mounting a button panel to the frame includes inserting the protruding member into the channel.

9. The method of claim 8, wherein the button panel forms the channel and the frame forms the protruding member.

10. An assembly for a wagering game machine, comprising:

a frame formed in a cabinet of a wagering game machine, the frame being located on a hinged front door of the cabinet and including a first closed side located opposite to a second closed side, a third closed side extending between the first closed side and the second closed side, and a fourth open side opposite the third closed side and extending between the first closed side and the second closed side;

a button panel mounted to the frame by sliding the button panel along the first closed side and the second closed side through the fourth open side, the button panel supporting a plurality of physical buttons for operating the wagering game machine; and a movable retention member abutting a side of the button panel to keep the button panel flush against the frame, the movable retention member being moveable between a secure position and an unsecure position;

wherein the movable retention member, when in the secure position, is positioned in the fourth open side, holds the button panel in a fixed position relative to the frame, and prevents the button panel from being removed via the open side, and wherein the movable retention member, when in the unsecure position, is disengaged from the button panel and allows the button panel to be removed via the open side of the frame.

11. The assembly of claim 10, wherein the door is movable between an open position and a closed position, the button panel being retained by the retention member in the fixed position relative to the frame when the door is in the door open position and the retention member is in the secure position.

12. The assembly of claim 11, wherein the frame is formed by the door.

* * * * *